United States Patent [19]
Felter

[11] 3,739,708
[45] June 19, 1973

[54] TURBINE VENTILATORS
[76] Inventor: John V. Felter, 1307 Ashland, Houston, Tex. 77008
[22] Filed: Dec. 6, 1971
[21] Appl. No.: 204,949

[52] U.S. Cl. .......................... 98/72, 98/75
[51] Int. Cl. ............................ F23l 17/02
[58] Field of Search ...................... 98/72, 75

[56] References Cited
UNITED STATES PATENTS

| | | |
|---|---|---|
| 1,509,957 | 9/1924 | Krueger .......................... 98/75 |
| 1,965,171 | 7/1934 | Boyer ............................. 98/72 |
| 535,276 | 3/1895 | Doerge ........................... 98/75 |
| 1,702,120 | 2/1929 | Kimball .......................... 98/72 |

Primary Examiner—William F. O'Dea
Assistant Examiner—Peter D. Ferguson
Attorney—Carl B. Fox, Jr.

[57] ABSTRACT

Turbine ventilators having sealed lubrication at the lower turbine shaft end, having anti-noise connections between the lower turbine support ring and the shaft, and having an upper bearing assembly to compensate for side sway caused by wind pressure.

4 Claims, 2 Drawing Figures

Patented June 19, 1973
3,739,708
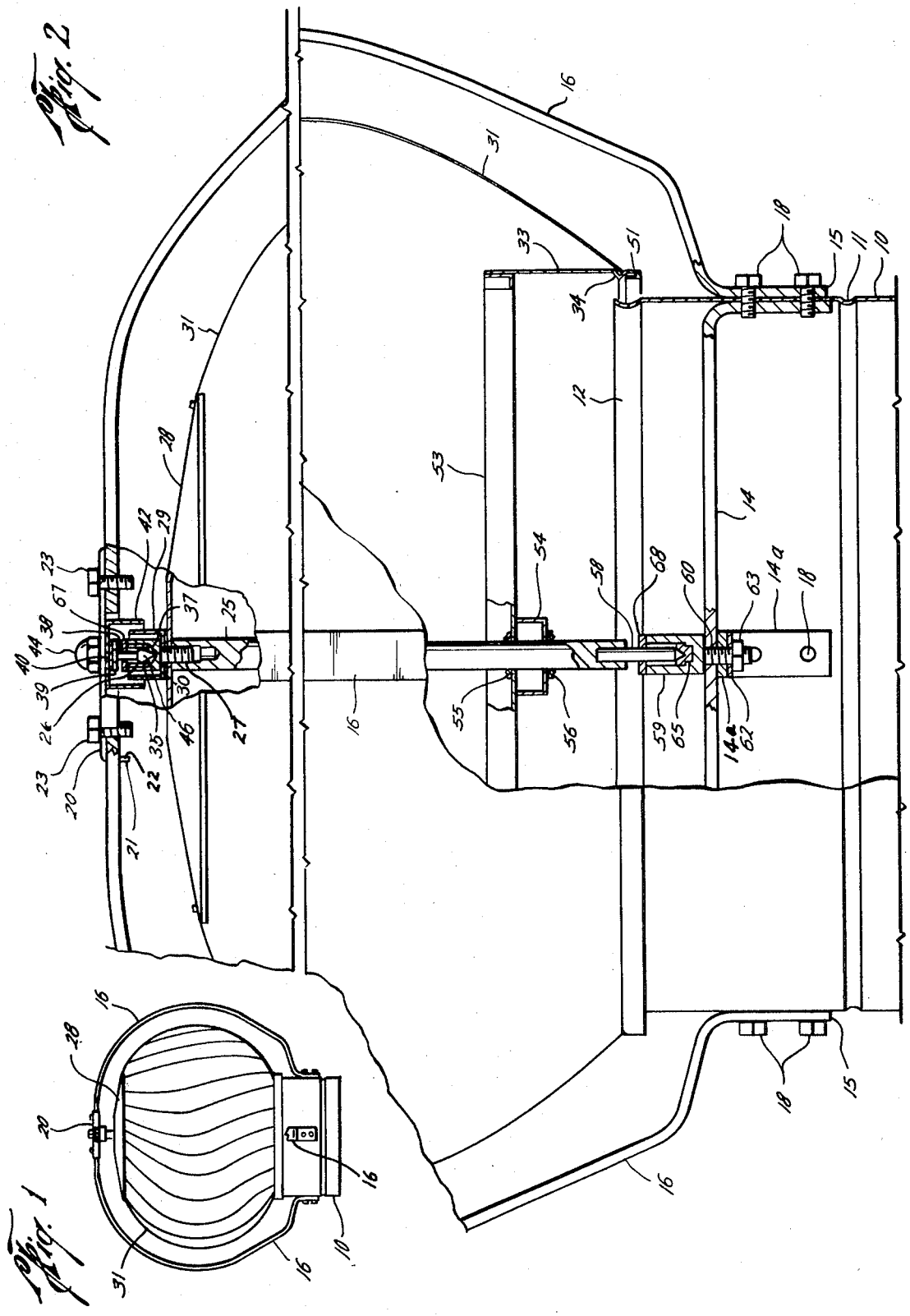

TURBINE VENTILATORS

BACKGROUND OF THE INVENTION

A particular problem encountered with turbine ventilators, often called rotary ventilators, is failure of adequate lubrication of the turbine shaft ends to provide extended noise-free operation. Lubrication of the shaft ends is a problem because the shaft end bearings are inaccessible for re-lubrication after the ventilator has been installed upon the roof of a home or building, because the incidence of dust and air passing through the ventilators is often relatively high, and because ventilators operate more or less continuously whereby their wear factor is high. A number of different types of bearings have been employed at the upper and lower turbine shaft ends, all with some unfavorable operating characteristics. In operation, the ventilators are subjected to wind pressures, so that lateral forces act on the ventilators which produce side sway especially at the upper end of the ventilator shaft. In many ventilators, the shaft end mountings eventually become loose so that considerable noise is created by rattle and vibration as the ventilator is rotated by air passing therethrough and by the wind. The ventilators are subjected to all kinds of weather, and to the entire temperature range of the area in which a ventilator is installed.

In the present ventilator structure, the lower bearing is protected by a loose floating bushing which is installed around the bearing pin to cover and protect the bearing. The floating bushing protects the bearing by keeping foreign matter out so that excessive wear of the bearing is not encountered. At the upper end of the shaft, the bearing is also covered, and the bearing pin is shaped to have a curved side enlargement permitting mis-alignment of the pin in the bearing whereby lateral forces on the ventilator do not seriously affect operation of the bearing. The cross members connecting the lower end of the turbine to the shaft are locked against vibration and noise by connectors which frictionally engage the shaft.

Other objects and advantages of the invention will appear from the following detailed description of a preferred embodiment of the invention, with reference to the accompanying drawings.

BRIEF DESCRIPTIONS OF THE DRAWINGS

FIG. 1 is a side elevational view of a ventilator of preferred form according to the invention.

FIG. 2 is an enlarged partial broken side view of the ventilator of FIG. 1, partially in elevation and partially in vertical section.

DESCRIPTION OF THE PREFERRED EMBODIMENT

Referring to the drawings in detail, a base ring 10 of cylindrical shape is formed of sheet metal or other suitable material. The ring may have its ends connected together in any suitable manner, as by screws, bolts, welding, soldering, or brazing, or the ring may be made of seamless construction. The ring is upset inwardly to form a rib 11 around its interior. The ring is generally installed connected over the upper end of a roof jack, and rib 11 limits the downward movement of the ring 10 onto the cylindrical end of the roof jack. The upper end of ring 10 has an inwardly upset rib 12 to provide rigidity of the ring. A pair of cross braces 14, 14a having downturned perforate ends, and the lower downturned ends 15 of plural wind brace members 16 are secured inwardly and outwardly, respectively, of base ring 10 by screws 18.

Wind braces 16 curve outwardly and around the turbine to terminate at a top bracket 20. The top bracket has downturned edge flange 21 having equally circularly spaced slots 22 into which the wind brace ends are received and screwed to the bracket by screws 23. Any number of wind braces 16 may be employed. Usually four wind braces 16, equally circularly spaced around the base ring and top bracket, are used.

A shaft 25 has a tapped axial opening at its upper end into which a bearing holder 26 is screwed. The stem 27 of the bearing holder is disposed through central openings of a crown plate 28 and through the bottom of an inside bearing cup 29 and through a lock washer 30 therebetween. The crown plate is concave downwardly, and the upper ends of turbine leaves or vanes 31 are secured therearound, usually by welding, or the like. The lower ends of the plural leaves or vanes 31 are connected to a sheet metal ring 33, of short cylindrical form. Ring 33 is inwardly upset to form a rib 34 therearound. The leaves 31 are of curved shape, and are disposed equally spaced surrounding the turbine structure between crown 28 and ring 33, and are pitched to catch the wind so that the wind blowing thereagainst will cause rotation of the turbine structure, in the manner well known in the art.

Inside bearing cup 29 is open upwardly, spaced around the bearing holder 26. An Oilite sleeve bushing 35 is disposed to line the inside of the bearing holder 26. The bearing holder is conical at its inside bottom at 37. A jewel bearing 38 has a shoulder 39 therearound above which is disposed a lock washer 40 which bears against the underside of the bottom of downwardly open outside bearing cup 42. The threaded upper end of bearing 38 passes through a central opening in the bottom of cup 42 and through an opening of the same size through top bracket 20, and an acorn nut 44 is tightened thereon. The lower end 46 of jewel bearing 38 is enlarged and of rounded shape, and reduces to a point at its lower end. The tip of the jewel bearing normally rotates at the center of conical bottom 37 of the bearing holder 26, but the tip can move away from center on the conical bottom when the top of the ventilator is moved sideways by wind pressure, the rounded sides of the bearing still contacting the bushing as the shaft moves sideways, i.e. side sway, the action of the bearing still remaining effective.

The lower edge of ring 33 is inwardly bent and flattened at 51 to strengthen the ring. The lower edge of ring 33 is spaced outwardly around the upper end of base ring 10, slightly overlapping the same as shown. A pair of cross braces 53, 54, at right angles one to the other, are disposed across the upper sides of ring 33 to reinforce the same and to provide connection with shaft 25. Both braces 53, 54 are of channel cross section, with their closed sides downwardly disposed. A pair of retaining rings 55, 56 are employed to connect the cross braces to the shaft. The retaining rings are of the plural radial slitted type which when pushed against the braces will retain their positions frictionally. The retaining rings provide easy connection between the cross braces and the shaft, at the same time preventing noise, vibration and clatter at the connection. The use of the retaining ring simplifies assembly of the apparatus, yet affords an entirely satisfactory, noise-free connection.

The lower end of shaft 25 is provided with a coaxial bore into which the upper end of a lower bearing pin 58 is received. The connection is press fitted to be free of vibration. A lower bearing holder 59 has a lower concentric stud 60 which is received through openings at the centers of cross braces 14, 14a. Lock washer 62 and nut 63 connect the bearing holder to the cross braces. A jewel bearing seat 65 of stepped outer form is disposed upon the stepped bottom of the bearing holder. The jewel bearing seat has a conical recess at its upper side. The lower end of bearing pin 58 is conically pointed and may be of the same taper as the conical recess of the bearing seat, or of different taper, and is disposed therein. The bearing pin end is usually of sharper taper than the seat.

In order to prevent dust, dirt, water, or other foreign matter, from entering bearing holders 26 and 59, oilite thrust bearings 67 and 68, having the forms of flat washers, are disposed around bearing pins 38 and 58. Bearings 67 and 68 lie flat upon the open upper ends of the bearing holders to form covers therefor. Pins 38 and 58 extend through the center openings of the bearings, and may be disposed tightly enough therethrough so that bearing 67 remains stationary with pin 38 and bearing 68 rotates with pin 58, or may be disposed loosely enough therethrough so that bearing 67 rotates with bearing holder 26 and pin 58 rotates while bearing 68 remains stationary upon bearing holder 59, or both conditions may occur from time to time. In any event, the flat bearings effectively close the bearing holders to retain lubricant therein and to protect the bearing surfaces, so that the life of the bearings is greatly increased and the bearing performance is improved throughout its life.

The washer-shaped thrust bearings 67, 68 lock in the lubricant in the bearing holders 26, 59, and keep the lubricant clean, so that the lubricant lasts longer and works more effectively, thereby insuring longer, more effective service from the apparatus.

Upon comparison with competitive rotary turbine ventilators, the ventilators herein disclosed, when placed in rotation together with ventilators of other forms, will rotate up to twenty times as long before coming to rest.

While a preferred embodiment of the invention has been described and shown in the drawings, many modifications thereof may be made by a person skilled in the art without departing from the spirit of the invention, and it is intended to protect by Letters Patent all forms of the invention falling within the scope of the following claims.

I claim:

1. Rotary ventilator, comprising a turbine cage assembly comprising upper cap means, and lower turbine ring means having brace means thereacross, and a plurality of equally circularly spaced vertically elongate vane means connected to extend between said upper cap means and said lower ring means; base ring means adapted for connection at its lower end to a ventilation outlet conduit and having brace means thereacross; upwardly concave lower bearing seat means supported on said base ring cross brace means at the center of said base ring means; wind brace means extending from said base ring means to above said cap; shaft means having lower bearing pin means seated for rotation in said lower bearing seat means, and being connected to said cap, and having upwardly concave upper bearing seat means at its upper end; upper bearing pin means supported by said wind brace means above said cap and seated in said upper bearing seat means for rotation of said upper bearing seat means and shaft; said turbine ring brace means having an opening through which said shaft means is disposed, and connection means between said turbine ring brace means and said shaft means comprising clamp means disposed against the upper and lower sides of said turbine ring brace means and frictionally engaging said shaft to eliminate relative vibrations between said turbine ring brace means and said shaft to eliminate noise produced by such vibrations.

2. The combination of claim 1, said clamp means comprising inwardly radially slotted washer means having one face against a side of said turbine ring brace means and frictionally distended against said shaft means at the opposite face.

3. Rotary ventilator, comprising a turbine cage assembly comprising upper cap means, and lower turbine ring means having brace means thereacross, and a plurality of equally circularly spaced vertically elongate vane means connected to extend between said upper cap means and said lower ring means; base ring means adapted for connection at its lower end to a ventilation outlet conduit and having brace means thereacross; upwardly concave lower bearing seat means supported on said base ring cross brace means at the center of said base ring means; wind brace means extending from said base ring means to above said cap; shaft means having lower bearing pin means seated for rotation in said lower bearing seat means, and being connected to said cap, and having upwardly concave upper bearing seat means at its upper end; upper bearing pin means supported by said wind brace means above said cap and seated in said upper bearing seat means for rotation of said upper bearing seat means and shaft; said turbine ring brace means having an opening through which said shaft means is disposed, and connection means between said turbine ring brace means and said shaft means comprising clamp means disposed against the upper and lower sides of said turbine ring brace means and frictionally engaging said shaft to eliminate relative vibrations between said turbine ring brace means and said shaft to eliminate noise produced by such vibrations, and including perforate thrust bearing means having the perforation thereof disposed around at least one of said upper and lower bearing pin means and against the concave upper side of the bearing seat means to prevent entry of materials into the bearing seat means and to retain lubricant therein.

4. The combination of claim 3, said clamp means comprising inwardly radially slotted washer means having one face against a side of said turbine ring brace means and frictionally distended against said shaft means at the opposite face.

* * * * *